3,284,420
MODIFIED ETHYLENE-PROPADIENE POLYMERS
Stanley Tocker, Wilmington, Del., assignor to E. I. du Pont de Nemours and Company, Wilmington, Del., a corporation of Delaware
No Drawing. Filed May 24, 1965, Ser. No. 458,376
3 Claims. (Cl. 260—79.3)

This application is a continuation-in-part of my co-pending application Serial No. 148,049, filed October 27, 1961, now abandoned, which in turn is a continuation-in-part of my application Serial No. 800,665, filed March 20, 1959, and now abandoned.

This invention relates to the manufacture of thermoplastic polymeric films. More particularly, it relates to the preparation of polyhydrocarbon films suitable for conversion to bags, containers and similar packages.

The invention will be described primarily as it applies to polyethylene films. However, it will be clear that the invention is equally applicable to shaped structures of all types composed of polymers of alpha-olefins in general. Thus, filaments, foils, rods, tubes, as well as self-supporting films, are embraced by the present invention. The statements regarding prior polyethylene products and the utility of the present invention are equally applicable to polymers of propylene, butylene, styrene, pentene-1, hexene-1, heptene-1, octene-1, decene-1, 3-methyl butene-1, 4-methyl pentene-1, 4-4-dimethyl pentene-1 and isobutylene, etc., as well as polymers of ethylene.

Polyethylene, in the form of a self-supporting film, displays many properties which make it particularly desirable as a packaging film. The polyethylene film is characterized by high impact strength, high tenacity, high elongation combined with chemical inertness and low permeability to water vapor. However, polyethylene films lack some requisites for some important applications. The most outstanding is its lack of adherability. Thus, printing, a necessary treatment for successful use of packaging materials, is performed with great difficulty due to the lack of adherability of printing inks to the film's surface. Coatings and laminates, useful for special purposes such as improving heat-sealability, etc., are difficult to apply because of the film's lack of adherability to itself and other materials. Another property lacking in these polymers in the form of films is stiffness. The limpness apparent in many polyhydrocarbon films, particularly polyethylene film, militates against their use in conventional bag-making and bag-processing machines. Still another property that can be improved is the polymer's stability to light.

One object of the present invention is a process for remedying the above-described situation, i.e., a process for improving the above properties without affecting adversely the desirable properties of the polymer. Another object is to form novel polymeric compositions that display improved properties, particularly improved adherability to itself and other materials, increased stiffness and/or increased stability to light. Other objects will appear hereinafter.

The objects are accomplished by a polymeric composition comprising a modified copolymer of 65–99 mole percent, preferably 90–97 mole percent, of an alpha-olefin, such as ethylene, which provides in said copolymer a recurring group having the structure:

wherein R is hydrogen or alkyl of 1–8 carbon atoms; and 1–35 mole percent, preferably 3–10 mole percent, of propadiene, said copolymer having been modified by reaction with an oxy acid of sulfur, such as sulfuric acid, sulfurous acid, chlorosulfonic acid, thiosulfuric acid, pyrosulfuric acid and para-toluene sulfonic acid, which provides in said copolymer a resulting 1–35 mole percent of one or more groups, in a random selection of each, from the group consisting of:

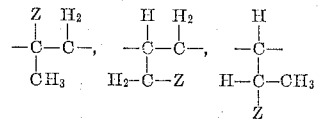

and

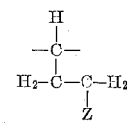

where Z is the monovalent sulfate radical.

The process involves first copolymerizing 65–99 mole percent of the alpha-olefin with 35–1 mole percent of propadiene by subjecting the monomers, preferably in a liquid hydrocarbon or halogenated hydrocarbon such as hexane, benzene, toluene, tetrachloroethylene, bromobenzene, chlorobenzene, etc., to a temperature of −40° to 300° C. and a pressure of 1–1000 atmospheres in the presence of a "coordination catalyst"; isolating the resulting polymer; and, thereafter, reacting the polymer with an oxy acid of sulfur.

A "coordination catalyst" may be defined in its broadest sense as one formed by the reaction of a reducible polyvalent metal compound with an amount of a reducing agent sufficient to reduce the valence of the metal component. Specifically, the catalyst is composed of:

(A) A compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and -O-hydrocarbon; and (B) A reducing compound selected from the group consisting of metal hydrides and compounds having a metal of Groups I, II and III of the Periodic Table, said metal being above hydrogen in the electromotive series of the metals, attached directly through a single bond to a carbon atom, said carbon atom selected from the group consisting of trigonal carbon and tetrahedral carbon.

In the above definitions, Periodic Table means Mendeléeff's Periodic Table of the Elements, 25th ed., Handbook of Chemistry and Physics, published by the Chemical Rubber Publishing Co.

Ordinarily, catalytic amounts of the components of the catalyst system may be used in the first step of the process. Thus, component (A) may comprise 0.01–20 millimoles or higher, preferably 0.2–20 millimoles, per liter of solvent plus monomers. The mole ratio of component (B)-to-component (A) in the catalyst system should be at least 1:1, preferably 1:1 to 100:1

Component (A) in the catalyst system has been defined as a compound containing at least one metal selected from the group consisting of metals of Groups IVa, Va and VIa of the Periodic Table, iron, cobalt, copper, nickel and manganese, having directly attached to it a halogen atom, oxygen atom, hydrocarbon or -O-hydrocarbon group. Typical Group IVa metals are titanium, zirconium and hafnium; Group Va metals, vanadium, columbium and tantalum; Group VIa metals, chromium, molybdenum and tungsten. Specific examples of the compounds included in the above definition are titanium tetrachloride, titanium tetrafluoride, zirconium tetrachloride, niobium pentachloride, vanadium tetrachloride, vanadyl trichloride, tantalum pentabromide, cerium trichloride, molybednum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate, and the like.

Component (B) in the catalyst system has been defined as a reducing compound selected from the group consisting of metal hydrides and compounds having a metal of Groups I, II and III of the Periodic Table above hydrogen in the electromotive series, attached directly through a single bond to a trigonal or tetrahedral carbon atom. A trigonal carbon atom is a carbon atom having two single bonds and a double bond;

Groups which may be attached to a metal, which metal is attached to a trigonal carbon atom, are aryl groups or arylalkyl groups. By tetrahedral carbon atom is meant a carbon atom having four single bonds;

Groups which may be attached to a metal, which metal is attached to a tetrahedral carbon atom, are alkyl groups, aryl groups, alkylaryl groups and alkenyl groups. Specific examples of useful reducing agents included in this definition are phenyl magnesium bromide, lithium aluminum tetraalkyl, aluminum trialkyl, dimethyl cadmium, diphenyl tin, and the like.

Useful combinations of component (A) and component (B) compounds for use as catalyst systems in the invention include the following:

Vanadyl dichloride (VOCl$_2$) plus aluminum diisobutyl butoxide
Vanadyl trichloride (VOCl$_3$) plus aluminum triisobutyl
Vanadyl trichloride (VOCl$_3$) plus aluminum hydride (AlH$_3$)
Vanadyl trichloride (VOCl$_3$) plus lithium butyl
Vanadium dichloride (VCl$_2$) plus aluminum triisobutyl
Vanadium trichloride (VCl$_3$) plus aluminum isobutyl dichloride
Vanadium tetrachloride (VCl$_4$) plus aluminum isobuyl dibutoxide
Vanadium tetrachloride (VCl$_4$) plus aluminum triisobutyl
Vanadium tetrachloride (VCl$_4$) plus aluminum hydride (AlH$_3$)
2-ethyl hexyl vanadate plus aluminum triisobutyl
Titanyl dichloride (TiOCl$_2$) plus aluminum isobutyl dichloride
Titanium tetrachloride (TiCl$_4$) plus ethyl magnesium bromide
Titanium tetrachloride (TiCl$_4$) plus aluminum triisobutyl
Titanium tetrachloride (TiCl$_4$) plus lithium aluminum tetraisobutyl
Titanium tetrachloride (TiCl$_4$) plus sodium napthalene
Tetraisopropyl titanate Ti(OC$_3$H$_7$)$_4$ plus aluminum triisobutyl
Tetraisobutyl titanate Ti(OC$_4$H$_9$)$_4$ plus sodium naphthalene
Cobaltous chloride (CoCl$_2$) plus aluminum triisobutyl
Cobalt hexammonium chloride Co(NH$_3$)$_6$Cl$_2$ plus aluminum triisobutyl
Manganese bromide (MnBr$_2$) plus aluminum triisobutyl
Manganese bromide (MnBr$_2$) plus zinc diisobutyl
Chromium chloride (CrCl$_3$) plus aluminum triisobutyl
Cuprous chloride (Cu$_2$Cl$_2$) plus aluminum triisobutyl
Ferric bromide (FeBr$_3$) plus aluminum triisobutyl
Molybdenum chloride (MoCl$_5$) plus aluminum triisobutyl
Nickel chloride (NiCl$_2$) plus aluminum triisobutyl Polymerization is preferably carried out in a solvent medium. Among the solvents which have been found useful in this step are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used.

The reaction conditions, temperature and pressure, at which polymerization is performed may be extremely mild. Temperatures of the reaction may range from —40° to 300° C. and pressures of 1 atmosphere to 1000 atmospheres may be used successfully. The optimum conditions of temperature and pressure are 0°–300° C. and not more than 500 atmospheres respectively.

As an illustration of a method contemplated for carrying out the present invention, the catalyst system, e.g., vanadyl trichloride and aluminum triisobutyl, is mixed in the hydrocarbon solvent, e.g., n-hexane, under a blanket of nitrogen gas. Component (A), vanadyl trichloride may be present to the extent of about 5 millimoles and component (B), aluminum triisobutyl, may be present to the extent of about 10 millimoles. After stirring for about ten minutes at a temperature of about 25° C., the nitrogen supply is cut off and the gas stream composed of ethylene and/or other hydrocarbon monomer or monomers having terminal ethylenic unsaturation with propadiene in the desired mole ratio is passed into the catalyst suspension. Alternatively, the monomers may be introduced first into the reaction vessel, followed by introduction of the catalyst. The order of adding catalyst and monomers is not critical to the present invention. After sufficient polymer is built up, the gas flow is stopped and water, methanol, ethanol or a similar low molecular weight alcohol, is added to destroy the catalyst. The copolymer or terpolymer (depending on the number of monomers used), is then isolated and purified in a manner known to those skilled in the art.

The mole ratio of propadiene-to-ethylene and/or other hydrocarbon monomer reacted should be such that the product of this step is composed of 1–35 mole percent propadiene (preferably 3–10 mole percent) and 99–65 mole percent (preferably 97–90 mole percent) of the other hydrocarbon monomer or monomers. It has been found that the reaction is very efficient so that a reaction mixture of about 1–35 mole percent propadiene and about 99–65 mole percent of the remaining monomer or monomers usually will provide the desired product.

The product of this step is a substantially linear polymer having pendant vinyl and methylene groups and having an inherent viscosity of at least 0.3. The different pendant groups will result from the fact that propadiene will copolymerize with monomers by more than one mechanism. Thus, propadiene will appear in a carbon-to-carbon chain with a pendant methylene group:

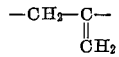

or it will appear in the carbon-to-carbon chain with a pendant vinyl group:

or any combinations of these. Most copolymers will contain some of each of the above types of structure, i.e., copolymers with propadiene will usually have some pendant methylene groups and some pendant vinyl groups. The present invention also contemplates copolymers with propadiene in the form of block copolymers, random copolymers or combinations of block and random. The determination of pendant vinyl groups and pendant methylene groups can be accomplished by infrared spectral techniques known to those skilled in the art, including those described by W. M. D. Bryant and R. C. Voter in "Journal of American Chemical Society" 75, 6113 (1953), and F. W. Billmeyer in "Textbook of Polymer Chemistry," chapter 7, Interscience Publishers (1957).

In the modifying step, the polymer composed of 1–35 mole percent propadiene is reacted with the oxy acid of sulfur. The polymer can be in the form of a particulate mass or a fiber or a film. Reaction can be carried to any degree. Preferably, the polymer is shaped into a structure in ways well known to those skilled in the art prior to reaction. Thus, the polymer can be melt pressed at a temperature of about 150° C. or higher to form a film. The reaction can be effected with the entire polymeric structure or reaction can be limited to the surface of the structure.

To react the ethylene/propadiene copolymer prepared in the first step with the oxy acid of sulfur, the copolymer can be placed in an aqueous solution of the oxy acid such as sulfuric acid at a temperature of 30°–100° C. for a period of 1 second to 10 minutes. The reaction serves to add sulfate

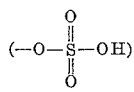

groups to the polymer. These groups tend to increase the adherability of the polymer, particularly the surface of the polymer in the form of a film.

The time required for contacting the copolymer with the oxy acid of sulfur depends on a number of factors such as temperature, composition of copolymer, and the specific result desired. Thus, in effecting treatments with sulfuric acid to increase adherability of film surfaces, the time required for reaction is determined by carrying out the reaction and testing film surface adherence to itself or to other materials which may be adhered to it after different time periods. Higher temperatures, higher concentrations of the sulfuric acid and higher percentages of propadiene in the copolymer tend to reduce the time necessary for reaction. After reaction is complete, the product is separated from the mixture, washed with water and dried.

The utility of polymers containing the sulfate groups attached to some of the recurring units lies primarily in the adherability imparted to the polymer. Other effects are also realized. Thus, dyeability is improved, static propensity is reduced and the slip characteristic of the surface is decreased.

It has been found that since the chemical transformations occur on unsaturated groups appended to the polymer chain, while the chain itself is essentially unaffected, the desired characteristics of the parent polymer are retained in the final product. Thus, the final product displays satisfactory tensile strength, impact strength, flex resistance, etc., while the property improved such as its adherence to printing inks, coatings, other films such as regenerated cellulose and polyethylene terephthalate, is increased substantially. Furthermore, it has been found that the adherability achieved shows no tendency to disappear upon aging.

The following examples are intended to provide a clearer understanding of the present invention. They should not be considered to limit the scope of the invention.

EXAMPLE 1

To 250 ml. of well agitated anhydrous tetrachloroethylene containing 0.5 ml. of vanadyl trichloride and 15 ml. of 1 molar aluminum triisobutyl in cyclohexane, there was introduced at a temperature of 95°–100° C., a 20:1 mole ratio of ethylene/propadiene gas stream at a rate of approximately 160 ml./minute. The reaction was allowed to proceed for 1 hour and 15 minutes. The gas flow was then stopped; the catalyst was destroyed by mixing in 50 ml. of methanol; and the copolymer was isolated and purified by filtering and washing in a Waring blender, using successively 100 ml. of 5% concentrated hydrochloric acid in isopropanol, two 150 ml. portions of 25% methanol in distilled water and 100 ml. of methanol.

A film made by pressing at 100° C. the resulting 20:1 mole ratio ethylene/propadiene copolymer was immersed in concentrated sulfuric acid at 50° C. for 3 seconds. The film was removed, washed wtih copious quantities of water and methanol, and was dried. Surprisingly, the film so treated showed excellent adhesion of printing inks, whereas films made from linear polyethylene after a similar treatment showed poor adhesion.

The printability test is carried out as follows: Printing ink (Multi-Brite 17W700 manufactured by Bensing Brothers and Deeney) is painted on the film in a very thin coating. The coated film is then dried 60° C. for 10 minutes. "Scotch" cellophane tape is then pressed tightly against the coated surfaces. The tape is then ripped off. The quantity of ink that comes off with the tape indicates the quality of the ink-to-film bond, the printability:

(1) Excellent indicates none or only a trace of ink removed;
(2) Good, 1–5% removed;
(3) Fair, 5–10% removed;
(4) Poor, more than 10% removed.

In the following table, a series of ethylene/propadiene copolymeric films were treated as described with the printability results shown. In all cases, a linear polyethylene film similarly treated received a "poor" rating for printability.

*Table I*

| Example | Ratio, Ethylene/ Propadiene Units in Copolymer | Treatment | Printability |
|---|---|---|---|
| 2 | 50/1 | Concentrated H₂SO₄, 3 seconds, 100° C. | Good. |
| 3 | 9/1 | Concentrated H₂SO₄, 10 minutes, 30° C. | Do. |
| 4 | 20/1 | ___do___ | Fair. |
| 5 | 20/1 | Concentrated H₂SO₄, 10 minutes, 50° C. | Excellent. |
| 6 | 9/1 | Concentrated H₂SO₄, 1 minute, 50° C. | Do. |
| 7 | 20/1 | ___do___ | Do. |
| 8 | 50/1 | ___do___ | Do. |
| 9 | 9/1 | Concentrated H₂SO₄, 2 seconds, 50° C. | Do. |
| 10 | 9/1 | Concentrated H₂SO₄, 3 seconds, 100° C. | Do. |

The invention claimed is:

1. A modified copolymer of improved adherability to itself and other materials of 65–99 mole percent of ethylene and 1–35 mole percent of propadiene, said modification being by reaction with an oxy acid of sulfur selected from the group consisting of sulfuric acid, sulfurous acid, chlorosulfonic acid, thiosulfuric acid, pyrosulfuric acid and para-toluene sulfonic acid, to provide 1–35 mole percent of a random selection of recurring units selected from the group consisting of

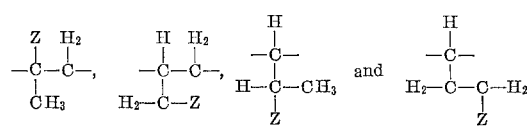

where Z is the sulfate radical.

2. The substantially linear polymer of claim 1 in the form of a self-supporting film.

3. A process for preparing polymer compositions of improved adherability to itself and other materials which comprises reacting a copolymer of 1–35 mole percent propadiene and 65–99 mole percent of ethylene, said copolymer having pendant methylene and vinyl groups as indicated by infrared absorption bands at wavelengths of 888 cm.$^{-1}$ and 993 cm.$^{-1}$, respectively, with an oxy acid of sulfur selected from the group consisting of sulfuric acid, sulfurous acid, chlorosulfonic acid, thiosulfuric acid, pyrosulfuric acid and para-toluene sulfonic acid, at a temperature of 30°–100° C. for a period of 1 second to 10 minutes, whereby sulfate radicals are added to the double bond of said pendant methylene and vinyl groups.

No references cited.

JOSEPH L. SCHOFER, *Primary Examiner.*

D. K. DENENBERG, *Assistant Examiner.*